(12) United States Patent
Nicoara et al.

(10) Patent No.: US 8,880,707 B2
(45) Date of Patent: Nov. 4, 2014

(54) HETEROGENEOUS NETWORK ACCESS ON DEVICES WITH ONE OR MORE NETWORK INTERFACES

(75) Inventors: Angela Nicoara, Mountain View, CA (US); Ahmad Rahmati, Houston, TX (US); Clayton Shepard, Houston, TX (US); Lin Zhong, Houston, TX (US); Jatinder Pal Singh, Mountain View, CA (US)

(73) Assignees: Deutsche Telekom AG, Bonn (DE); William Marsh Rice University, Houston, TX (US)

( * ) Notice: Subject to any disclaimer, the term of this patent is extended or adjusted under 35 U.S.C. 154(b) by 227 days.

(21) Appl. No.: 13/177,668

(22) Filed: Jul. 7, 2011

(65) Prior Publication Data

US 2012/0071141 A1 Mar. 22, 2012

Related U.S. Application Data

(60) Provisional application No. 61/383,847, filed on Sep. 17, 2010.

(51) Int. Cl.
*H04W 88/06* (2009.01)
*H04W 48/16* (2009.01)
*H04L 29/08* (2006.01)
*H04L 12/801* (2013.01)
*H04L 12/707* (2013.01)

(52) U.S. Cl.
CPC .......... *H04L 47/14* (2013.01); *H04L 29/08639* (2013.01); *H04L 45/22* (2013.01); *H04W 88/06* (2013.01); *H04L 47/19* (2013.01)
USPC ............ 709/227; 709/228; 370/235; 370/331

(58) Field of Classification Search
CPC ..... H04W 88/06; H04W 48/18; H04W 36/18; H04W 60/005; H04L 29/08639; H04L 12/5692
USPC ............... 370/412, 352, 235–338; 455/343.1, 455/414.1, 431, 435–445; 348/333.01; 709/220–228
See application file for complete search history.

(56) References Cited

U.S. PATENT DOCUMENTS 7,009,952 B1\* 3/2006 Razavilar et al. ............. 370/331
8,750,188 B2\* 6/2014 Nicoara et al. ................ 370/311

(Continued)

OTHER PUBLICATIONS

Loureiro et al. "Policy Routing Architecture for IP Flow Mobility in 3GPP's Evolved Packet Core" published in IEEE Globecom 2010.\*

(Continued)

*Primary Examiner* — Wing F Chan
*Assistant Examiner* — Raji Krishnan
(74) *Attorney, Agent, or Firm* — Leydig, Voit & Mayer, Ltd.

(57) ABSTRACT

A method for managing TCP flows in a mobile device adapted to connect to two or more wireless network types includes enabling connection to a number of networks of different types at the mobile device and executing a plurality of Internet-enabled applications on the mobile device. Each such application forms an existing TCP connection over a first one of the wireless networks. The routing table is modified such that any additional TCP connection will be created on a second one of the wireless networks. The device determines that a termination condition has occurred and in response to determining that the termination condition has occurred, renders an interface on the mobile device to the first one of the wireless networks inoperative.

14 Claims, 6 Drawing Sheets

(56) References Cited

U.S. PATENT DOCUMENTS

| | | | | |
|---|---|---|---|---|
| 2005/0026619 | A1* | 2/2005 | Jha | 455/441 |
| 2005/0206769 | A1* | 9/2005 | Kump et al. | 348/333.01 |
| 2005/0265270 | A1* | 12/2005 | Yamato | 370/310 |
| 2006/0203804 | A1* | 9/2006 | Whitmore et al. | 370/352 |
| 2007/0135080 | A1* | 6/2007 | Islam et al. | 455/343.1 |
| 2010/0128696 | A1* | 5/2010 | Fantini et al. | 370/331 |
| 2011/0090794 | A1* | 4/2011 | Cherian et al. | 370/235 |
| 2011/0246629 | A1* | 10/2011 | Savolainen et al. | 709/220 |
| 2012/0140651 | A1* | 6/2012 | Nicoara et al. | 370/252 |

OTHER PUBLICATIONS

Nicoara et al, "MultiNets: Policy Oriented Real-Time Switching of Wireless Interfaces on Mobile Devices" published in 2012 IEEE 18th Real Time and Embedded Technology and Applications Symposium.*

Oliva et al, "IP Flow Mobility: Smart Traffic Offload for Future Wireless Networks" published in IEEE Communications magazine 2011.*

Clayton Shepard, A.R., Chad Tossell, Lin Zhong, Phillip Kortum LiveLab: Measuring Wireless Networks and Smartphone Users in the Field. *Proc. Workshop Hot Topics in Measurement & Modeling of Computer Systems (HotMetrics)*, pp. 15-20, 2010.

Rahmati, A. and Zhong, L. Context-for-Wireless: Context-Sensitive Energy-Efficient Wireless Data Transfer. *Proc. Int. Conf. Mobile Systems, Applications and Services (MobiSys)*. 165-178, 2007.

Balasubramanian, A., Mahajan, R. and Venkataramani, A. Augmenting Mobile 3G Using WiFi. *Proc. Int. Conf. Mobile Systems, Applications and Services (MobiSys)*, pp. 1-13, 2010.

Giannoulis, A., Fiore, M. and Knightly, E.W. Supporting vehicular mobility in urban multi-hop wireless networks *Proceeding of the 6th international conference on Mobile Systems, applications, and services*, ACM, Breckenridge, CO, USA, pp. 1-13, 2008.

Thompson, N., He, G. and Luo, H., Flow scheduling for end-host multihoming. in *IEEE INFOCOM*, Citeseer, pp. 1-12, 2006.

Kandula, S., Lin, K.C.-J., Badirkhanli, T. and Katabi, D. FatVAP: aggregating AP backhaul capacity to maximize throughput *Proceedings of the 5th USENIX Symposium on Networked Systems Design and Implementation*, USENIX Association, San Francisco, California, pp. 1-15, 2008.

Gustafsson, E. and Jonsson, A. Always Best Connected. *IEEE Wireless Communications*, 10 (1). 49-55, 2003.

Pahlavan, K., Krishnamurthy, P., Hatami, A., Ylianttila, M., Makela, J., Pichna, R. and Vallstron, J. Handoff in hybrid mobile data networks. *IEEE Personal Communications*, 7(2). 34-47, 2000.

Dogar, F. and Steenkiste, P. Catnap: Exploiting High Bandwidth Wireless Interfaces to Save Energy for Mobile Devices. *Proc. Int. Conf. Mobile Systems, Applications and Services (MobiSys)*, pp. 1-16, 2010.

Kim, S. and Copeland, J., TCP for seamless vertical handoff in hybrid mobile data networks. *Proc. Int. Conf. IEEE GLOBECOM*, 661-665, 2003.

Maltz, D. and Bhagwat, P., MSOCKS: An architecture for transport layer mobility. *Proc. Int. Conf. IEEE INFOCOM*, Citeseer, 1037-1045, 1998.

Chalmers, R. and Almeroth, K., A mobility gateway for small device networks. *Proc. Int. Conf. IEEE PerCom*, Citeseer, pp. 1-10, 2004.

Sharma, P., Lee, S., Brassil, J. and Shin, K., Handheld routers: Intelligent bandwidth aggregation for mobile collaborative communities. in *IEEE BroadNets*, Citeseer, pp. 1-11, 2004.

Traw, C. and Smith, J. Striping within the network subsystem, *IEEE Network*, 9 (4), pp. 22-32, 1995.

Sivakumar, H., Bailey, S. and Grossman, R.L. PSockets: the case for application-level network striping for data intensive applications using high speed wide area networks *Proceedings of the 2000 ACM/IEEE conference on Supercomputing (CDROM)*, IEEE Computer Society, Dallas, Texas, United States, pp. 1-6, 2000.

Hsieh, H., Kim, K., Zhu, Y. and Sivakumar, R. A receiver-centric transport protocol for mobile hosts with heterogeneous wireless interfaces. *MobiCom*, pp. 1-15, 2003.

Rodriguez, P., Chakravorty, R., Chesterfield, J., Pratt, I. and Banerjee, S. MAR: a commuter router infrastructure for the mobile Internet *Proceedings of the 2nd International conference on Mobile Systems, Applications, and Services*, ACM, Boston. MA, USA, pp. 217-230, 2004.

Pucha, H. and Hu, Y. Overlay TCP: Ending end-to-end transport for higher throughput. *Poster in ACM SIGCOMM*, pp. 1-2, 2005.

Hsieh, H. and Sivakumar, R. pTCP: An end-to-end transport layer protocol for striped connections. *Proc. IEEE ICNP*, pp. 1-10, 2002.

Han, H., Shakkottai, S., Hollot, C., Srikant, R. and Towsley, D. Overlay TCP for multi-path routing and congestion control. *IEEE/ACM Trans. Networking*, pp. 1-24, 2006.

Kandula S., Katabi, D., Sinha, S. and Berger, A. Dynamic load balancing without packet reordering. *SIGCOMM Comput. Commun. Rev.*, 37 (2), pp. 53-62, 2007.

Stemm, M. and Katz, R. Vertical handoffs in wireless overlay networks. *Mobile Networks and Applications*, 3 (4), pp. 335-350, 1998.

Perkins, C., Alpert, S. and Woolf, B. *Mobile IP; Design Principles and Practices*. Addison-Wesley Longman Publishing Co., Inc. Boston, MA, USA, pp. 66-82, 1997.

Hsieh, R., Zhou, Z. and Seneviratne, A., S-MIP: a seamless handoff architecture for mobile IP. in *IEEE Infocom*, Citeseer, pp. 1774-1784, 2003.

Sharma, S., Baek, I. and Chiueh, T. OmniCon: A mobile IP-based vertical handoff system for wireless LAN and GPRS links. Software Focus, 37 (7). 779-798, 2004.

* cited by examiner

HETEROGENEOUS NETWORK ACCESS ON DEVICES WITH ONE OR MORE NETWORK INTERFACES

RELATED APPLICATIONS

This application is related to and claims priority to U.S. Provisional Application 61/383,847, filed Sep. 17, 2010, entitled "A System For Heterogeneous Network Access On Devices With One Or More Network Interfaces," which is herein incorporated by reference in its entirety for all that it teaches, discloses, and references without exclusion of any part thereof.

TECHNICAL FIELD

This invention relates to network access for devices that are able to utilize one or more interfaces to connect to multiple networks, and relates more particularly to a system and method to allow dynamic switching between, and simultaneous usage of, multiple networks and/or network interfaces in the absence of application, backend, or network support.

BACKGROUND

As mobile communications technologies and Internet capabilities have matured and in some ways merged, the amount of data traffic over the mobile Internet has increased exponentially. For example, T-MOBILE networks have experienced an increase of 5000% in data traffic since the official launch of ANDROID G1 phones. This trend of increased mobile Internet usage will likely continue in the future, with increasing numbers and usage rates of services and applications.

To support such an increase in data traffic volume, operators have been forced, at great expense, to expand their physical infrastructures to serve their client base. With this, there has been a search for a way in which to minimize the required infrastructure changes and expenses. While the inventors have appreciated that offloading the data traffic to networks that require less infrastructure, such as Wi-Fi, may be possible via dynamic and simultaneous use of both Wi-Fi and cellular (3G/2G) networks, mobile devices traditionally support only one data network access at a given time. Furthermore, energy efficiency and battery life are critical considerations for mobile devices, and wireless data transfer consumes significant energy.

While it may be hypothetically possible to leverage multiple network interfaces by switching or aggregating network flows, such a system would employ or require backend support in the form of a proxy or gateway to combine or forward flows. However, the use of a gateway would entail additional complexity and expense, as it requires an additional network component, and may also impose a significant performance impact. Other possible solutions may require changes to the TCP/IP protocol. This would require modification to both the Internet infrastructure and pre-existing applications and operating systems, rendering any such system impractical for current real-life systems, applications and infrastructures.

Unlike the hypothetical approaches mentioned above, the system described below in certain embodiments presents a novel switching mechanism that can be fully implemented on the client side, and requires no proxy/gateway support, nor support from applications. However, it will be appreciated that the invention as protected is defined by the attached claims, regardless of whether the invention as claimed solves one or more of the noted deficiencies. Moreover, it is expressly noted, and should be fully appreciated by the reader, that the foregoing is not intended to be a survey or description of the prior art. Rather, it is a statement of background ideas set forth by the inventors intended to help the reader understand the following detailed description. As such, this background section provides just that—background information, not prior art information. To the extent prior art information is desired, it must be found in the art and knowledge otherwise available to the public, not in the foregoing.

SUMMARY

In an embodiment, a method is provided for managing TCP flows in a mobile device adapted to connect to multiple wireless network types. The method comprises enabling connection to multiple wireless networks of different types at the mobile device and executing a plurality of Internet-enabled applications on the mobile device. Each such application forms an existing TCP connection over a first one of the wireless networks. The routing table is modified such that any additional TCP connection will be created on a second one of the wireless networks. The device determines that a termination condition has occurred and, in response to determining that the termination condition has occurred, renders an interface on the mobile device to the first one of the wireless networks inoperative.

In another embodiment, an alternative method is provided for managing TCP flows in a mobile device adapted to connect to multiple wireless network types. The method in this embodiment includes enabling connection to multiple wireless networks of different types, executing a plurality of Internet-enabled applications on the mobile device, such that each application forms an existing TCP connection over a first one of the wireless networks. The existing TCP connections are monitored and a switch time at which switching disruption will be minimized over all connections is determined. At the switch time, the connections are switched to a second one of the wireless networks; and new connections on the mobile device are created on the new interface.

In another embodiment, a mobile device is provided including a processor for executing computer-executable instructions, a memory module comprising a non-transient computer-readable medium for storing computer-executable instructions and data corresponding to a routing table; and a network interface module adapted to connect the mobile device to multiple networks having different network types. The computer-executable instructions stored on the non-transient computer-readable medium of the memory module include instructions for enabling connection to a plurality of wireless networks of different types, instructions for executing a plurality of Internet-enabled applications such that each application forms an existing TCP connection over a first one of the wireless networks, instructions for modifying the routing table of the mobile device such that any additional TCP connection will be created on a second one of the wireless networks, instructions for determining that a termination condition has occurred, and instructions for rendering an interface on the mobile device to the first one of the wireless networks inoperative in response to the determining that the termination condition has occurred.

In another embodiment, a non-transient computer-readable medium for use by a mobile electronic processing device is provided. The non-transient computer-readable medium has stored thereon computer-executable instructions which include instructions for enabling connection from the mobile electronic processing device to a plurality of wireless networks of different types and instructions for executing a plurality of Internet-enabled applications on the mobile electronic processing device such that each application forms an existing TCP connection over a first one of the wireless networks. The computer-executable instructions further include instructions for modifying the routing table of the mobile electronic processing device such that any additional TCP connection will be created on a second one of the wireless networks, for determining at the mobile electronic processing device that a termination condition has occurred, and for rendering an interface on the mobile electronic processing device to the first one of the wireless networks inoperative in response to the determining that the termination condition has occurred.

BRIEF DESCRIPTION OF THE DRAWINGS

Other features and advantages of the invention will be appreciated from reading the following detailed description in conjunction with the included drawing figures of which.

DETAILED DESCRIPTION

The described system pertains to network access on devices that are able to utilize one or more interfaces to connect to multiple networks, either simultaneously, or one at a time, to allow dynamic switching between, and simultaneous usage of, multiple networks and/or network interfaces without application, backend, or network support.

In various embodiments, systems and techniques are presented for migrating flows between different network interfaces in a manner that does not require changes to an underlying client platform, existing application, networking protocol, or backend server, and with minimal impact to the user. This in turn allows dynamic switching between networks, and/or simultaneous usage of networks, in a transparent fashion for pre-existing applications running on the device.

Regarding the multiple networks employed in the described system, Wi-Fi and cellular interfaces have complimentary energy characteristics, in that Wi-Fi technology is more energy efficient for high data-rate transfers, but is less efficient when maintaining a connection for small and low data-rate transfers. In contrast, cellular technology is more energy efficient for smaller transfers and for maintaining connectivity. Switching between networks can occur either on one interface (i.e., between 3G- and 2G-only modes on a cellular interface, or between two Wi-Fi networks), or on two interfaces (i.e., between cellular and Wi-Fi), in order to improve efficiency, performance, and/or to offload data from congested and expensive 3G networks. Furthermore, switching between multiple Wi-Fi networks, or between Wi-Fi and cellular networks can provide a solution to Wi-Fi's lack of support for mobility, with minimal disruption to the user.

In an embodiment, Wi-Fi and cellular (3G/2G) networks on mobile devices are used for traditional applications in order to offload data traffic, improve energy efficiency and improve performance. The described system directs the migration of flows between different networks and/or network interfaces without requiring backend support or changes to current applications and protocols.

Figure 1:
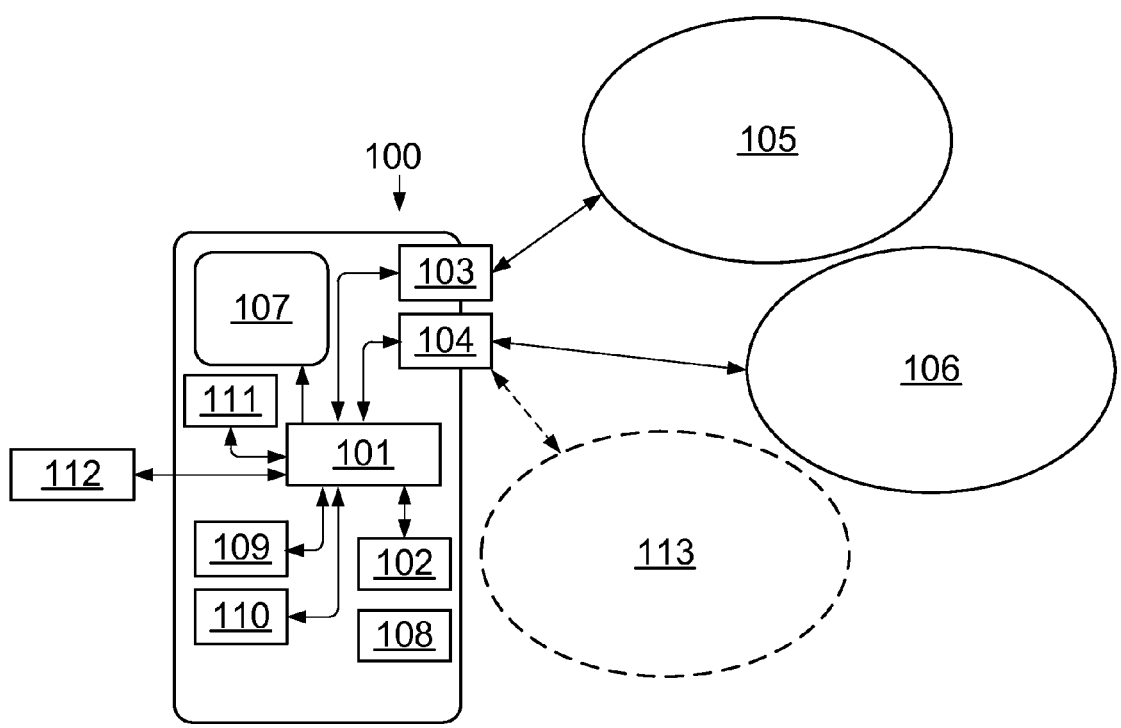
FIG. 1 is a device schematic showing a device and network environment within which various embodiments of the invention may be implemented.

Before discussing the details of flow migration, and simplified architecture is provided to enhance the reader's later understanding of the migration techniques. In particular, FIG. 1 is a schematic illustration of a mobile device 100 and associated connectivity environment, as may be usable within an implementation of the described principles. The mobile device 100 includes a processor 101 and memory 102. The processor, also referred to as a computerized device or computer processor, is an integrated circuit device that is capable of reading and executing computer-readable instructions from a computer-readable medium, e.g., a tangible non-transient computer-readable medium such as a the electronic memory 102, a built-in or removable flash memory (element 112), a magnetic or optical disc memory, etc. The processor 101 interacts with other elements via electrical, usually digital, inputs and outputs, and thus may execute communications tasks, display tasks, audio tasks, calculations, and other actions that may be generally observed on a mobile device.

The memory 102 may also be used to store data for use in or resulting from processor calculations, as well more permanent data such as phone numbers, images, settings, and so on. The system and method described herein, insofar as they are executed at or implemented on the mobile device itself, are implemented by way of a program or code (computer-readable instructions) read from memory 102 by the processor 101 and executed by the processor 101.

The mobile device 100 also comprises a plurality of network interfaces 103-104. Each network interface 103, 104 is adapted to provided communication to or from the mobile device 100 via a respective wireless network 105, 106. As noted above, the respective networks are preferably distinct from one another in type, and may include, for example, a WiFi network and a cellular (e.g., 3G, 2G) network. In an embodiment wherein a single interface is used to connect to multiple networks, there may be only a single interface 104, and it may be adapted to access multiple networks simultaneously, e.g., networks 106 and 113.

The mobile device 100 may also include a visual user interface 107, e.g., a screen, and a tactile user interface 108, e.g., a keyboard or touch sensor. In an embodiment, the touch sensor may be part of the screen. The mobile device 100 may further include a microphone 109 and speaker 110 for facilitating communications, as well as an additional optional speaker 111 for emitting ring tones, alert sounds, and so on.

As will be described in greater detail hereinafter, the mobile device in an embodiment uses the multiple network interfaces 103, 104 to use different networks in parallel and to control and migrate data flows between the interfaces in a manner that increase performance and throughput while potentially also increasing energy efficiency.

Several embodiments will be described for migrating network flows with minimum disruption to the user. A network flow is a sequence of packets sent either to or from the client, e.g., the mobile device 100. Examples include a TCP HTTP request from a client, and a UDP VoIP stream between peers.

In a first embodiment, the system leverages the fact that most TCP connections are short-lived. This embodiment requires that the mobile device be able to connect to multiple networks simultaneously. This may be through multiple interfaces (i.e., 3G/2G and Wi-Fi) as shown above or through one interface (i.e., multiple Wi-Fi networks through Virtual Wi-Fi).

Figure 2:
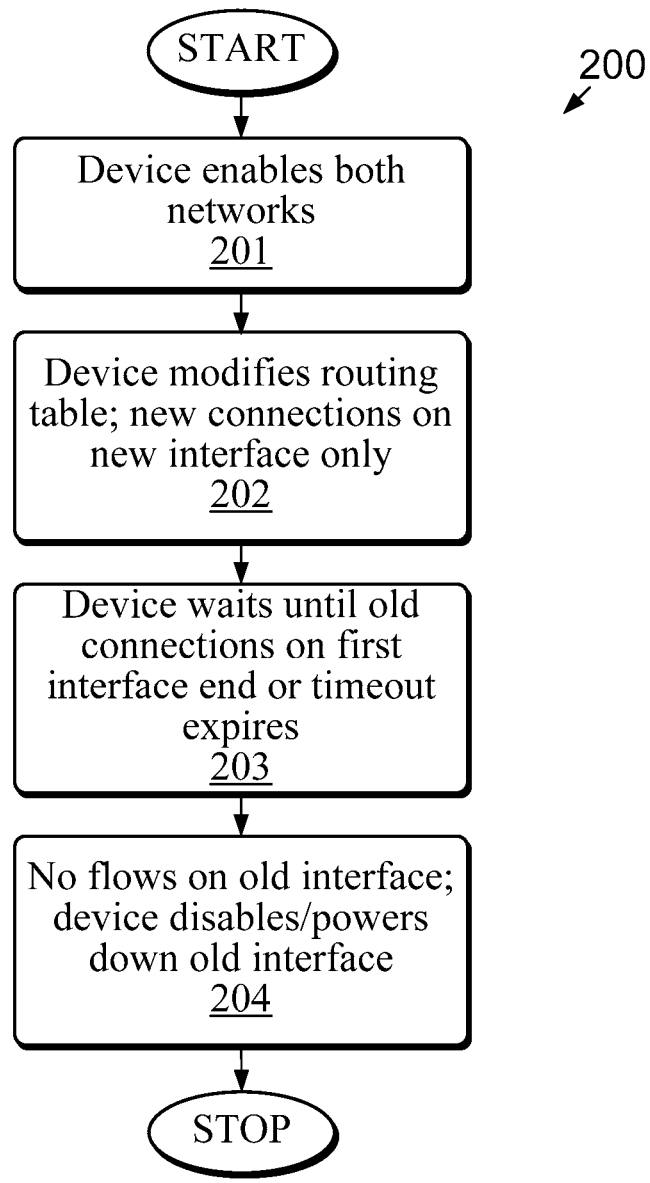
FIG. 2 is a flowchart showing a process of connection migration according to an embodiment of the invention.

In order to migrate one or more flows from the old interface to the new interface, a process as shown in FIG. 2 is executed in one implementation. At stage 201 of the process, the device enables both networks (e.g., via processor 101), so that the device is connected to both. At stage 202, the device modifies its routing table such that all new connections are created on the new interface. The device waits at stage 203 until the old, e.g., pre-existing connections on the first interface end, applying a predetermined timeout period in an embodiment, or until there are no more connections left on the old interface.

The timeout value for each connection can be set according to application, bandwidth or power considerations (e.g., power remaining status of the mobile device). The timeout may also be imposed by environmental or device characteristics, e.g. losing signal coverage. Finally, when there are no remaining flows on the old interface, the system disables or powers the old interface off altogether at stage 204.

An alternative embodiment of the invention also leverages the fact that most TCP connections are short-lived. However, unlike the prior embodiment, this alternative embodiment only requires that the system remain connected to one network. Thus, rather than waiting and gradually migrating connections, the device monitors TCP connections in this alternative embodiment and based on observing the behavior of the connections, chooses the best moment to switch within a specific allowed range, in order to minimize disruptions. In this embodiment, the device may also prevent new connections momentarily to reduce possible disruptions while monitoring and switching.

Figure 3:
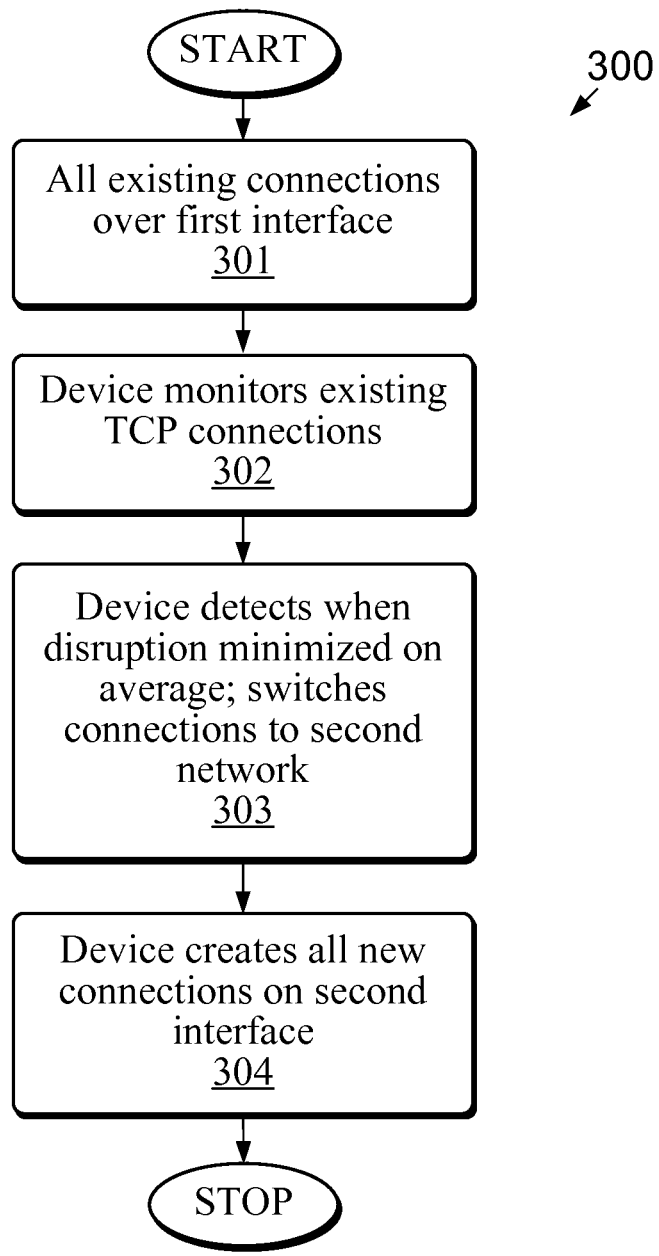
FIG. 3 is a flowchart showing a process of connection switching according to an embodiment of the invention.

This alternative process 300 is shown in FIG. 3. Thus, at stage 301, the existing connections are over the first (old) interface, and at stage 302 the device begins to monitor existing TCP connections. When the monitoring detects a switch time at which disruptions will be minimized for all connections on average, it switches the connections to the second network at stage 303. In an embodiment of the invention, the potential disruption is assumed to be minimized when the number of active concurrent/parallel TCP connections over a network interface is at a minimum (e.g., as small as possible). Finally, at stage 304, the new connections are created on the new interface.

Figure 4:
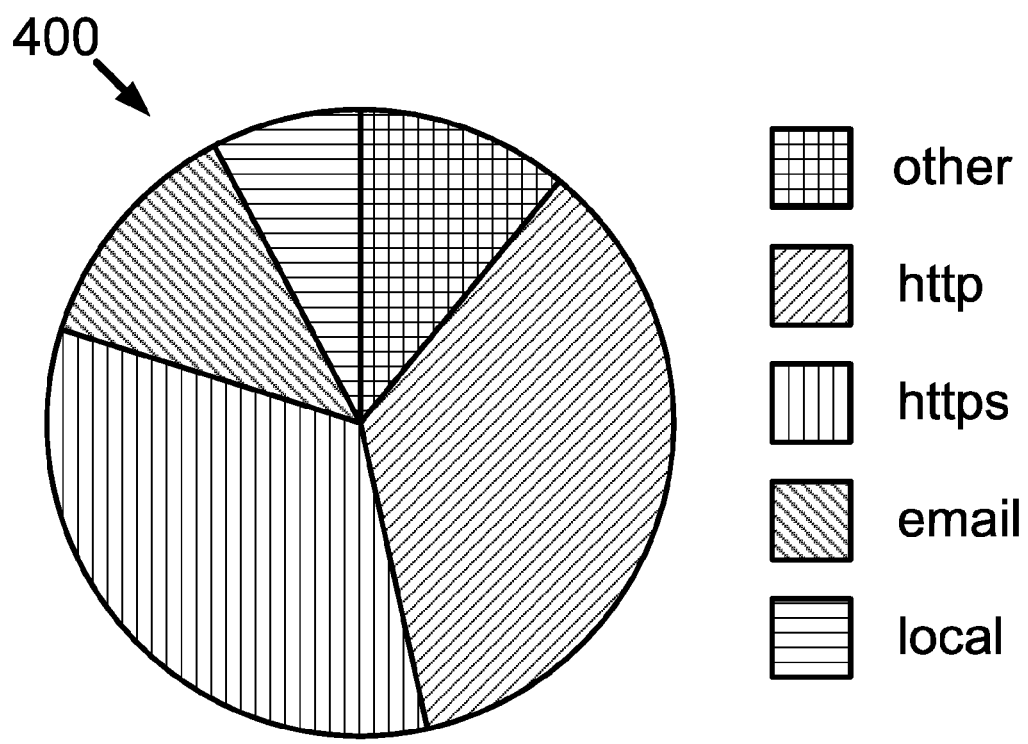
FIG. 4 is a pie chart graph showing relative proportions of TCP connection usage based on application type.

In order to analyze the performance aspects and advantages of the described embodiments while switching and/or aggregating multiple networks on consumer mobile device, certain details regarding Internet usage characteristics, in particular TCP flows from mobile users, will be discussed. To increase the reader's understanding of the proportions involved, the pie chart 400 of FIG. 4 illustrates the relative fractions of various TCP flows utilized for exemplary applications in an embodiment of the invention.

An application embodying the described principles was installed on mobile phones and network traces were collected from the mobile users over a period of time. From these traces, the characteristics of TCP flows on phones in real-life usage were observed. In general, it was confirmed that most often, TCP flows are short-lived, and that individual applications normally use at most one TCP connection at a time.

TCP does not provide for migrating flows. Therefore, the analysis measured the flow lengths during the time they were connected, without including the disconnection (teardown) phase (e.g., wait_fin). The statistics vary and are thus presented separately based on the display status (on/off) as an indicator of whether the user is using the phone interactively.

TCP Flow Types based on application type. Ignoring local (loopback) flows, i.e. flows internal to the phone, the three types are Web (HTTP, HTTPS) (Ports 80, 443); Email (IMAP, POP3, SMTP) (Ports 25, 110, 143, 993, 995); and other (all other connections). Using the data collected from the field study, the inventors identified the eight most common Internet accessing applications. These account for over 95% of phone use, and include PANDORA (music streaming) and SKYPE. Other applications, including those without specifically requiring Internet connectivity, are clustered together as other. Finally, applications that are ongoing while the display is off (i.e., non-interactive applications) are grouped together. FIG. 4 discussed above shows the fraction of TCP flows utilized for each application. The most common flows were web (HTTP, HTTPS). This shows the importance of properly handling such flows when switching between different networks.

Figure 5:
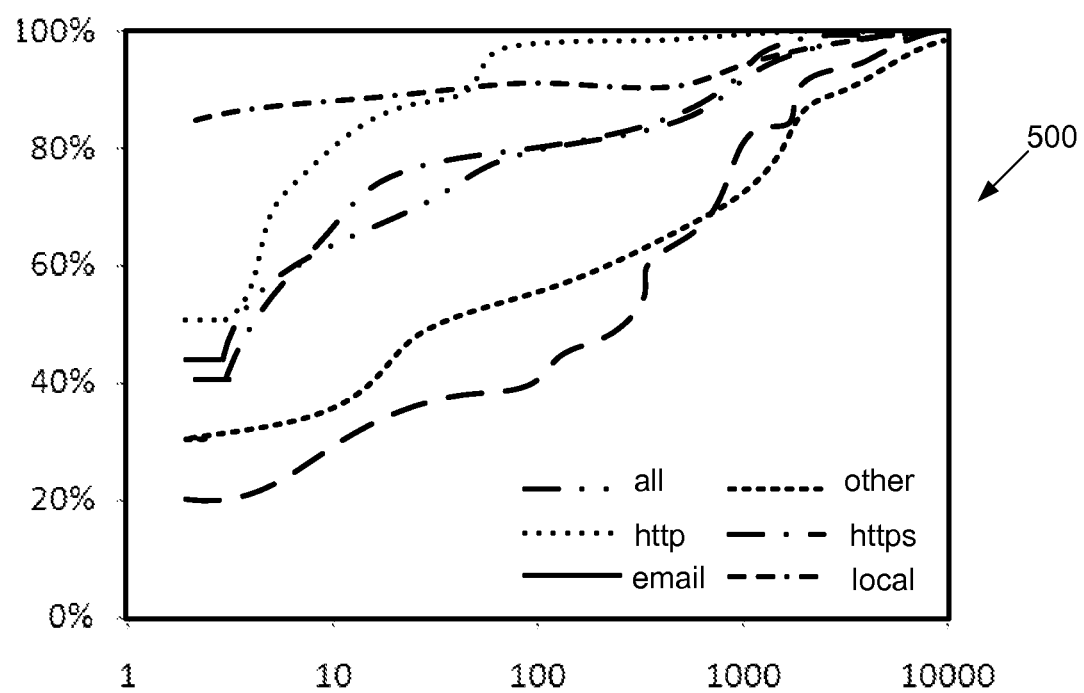
FIG. 5 is a data plot showing the CDF of TCP flow lifetimes in seconds, averaged among all users according to an embodiment of the invention.

A wide variation in the lifetime of TCP flows on the experimental phones was observed. Consistent with this, FIG. 5 is a simplified data plot illustrating the CDF (cumulative distribution function) distribution 500 of TCP session lengths, averaged among participants. A second finding is that most flows are short-lived, e.g. ~2 seconds or less. This includes 50% and 44% of flows for non-interactive and interactive sessions, respectively. In turn, this limits the effectiveness of power saving schemes which rely on long-lived downloads.

A third finding was that the distribution of flow lifetimes varies significantly based on application. As shown in FIG. 4, the fraction of short-lived local sessions (i.e. localhost to localhost) is significantly higher (about 86%) and the fraction of short-lived email connections (i.e. imap, SMTP, pop3) is much lower (about 30% and 20% for non-interactive and interactive sessions).

Figure 6:
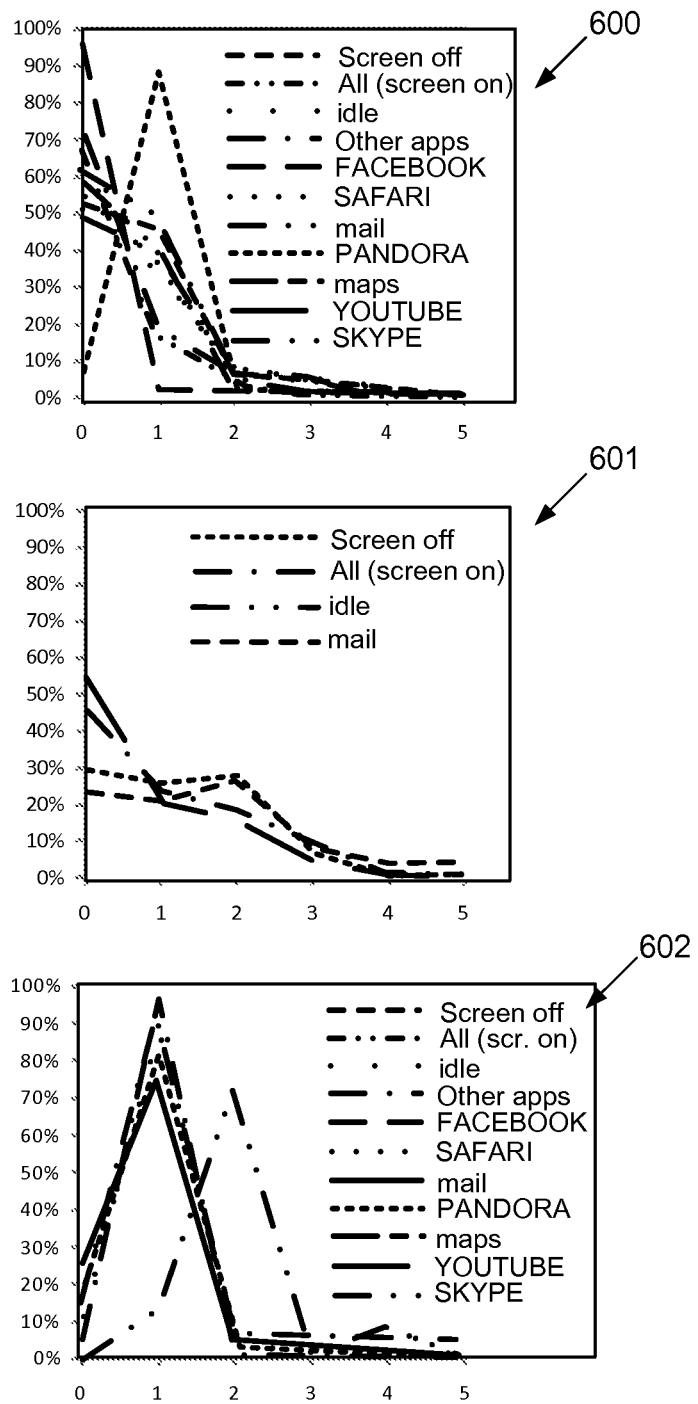
FIG. 6 is a collection of data plots showing a distribution of number of TCP flows when running different Internet enabled applications.

Moreover, it was observed that there was almost always one or more TCP sessions in progress whenever the phone's processor was running (about 96% and 97% of the time for non-interactive and interactive sessions respectively). The median number of connections was 2 for both interactive and non-interactive sessions, with different applications have different patterns of TCP flow utilization. For example, FIG. 6 shows the distribution of number of concurrent TCP connections for different applications, for the flow types discussed above (Web, Email, other). It can be seen that even when running Internet-enabled applications, the phone is typically not engaged with one (or multiple) TCP connection continuously, the exceptions being PANDORA and SKYPE.

Thus, referring more specifically to FIG. 6, plot 600 shows TCP connections for an environment running FACEBOOK, SAFARI, mail, PANDORA, maps, YOUTUBE, and SKYPE. In contrast, plot 601 shows the TCP connections when the applications involved are mail and the normal phone functions. Finally, plot 602 shows the TCP connections made when the applications involved include those of plot 601 in addition to other internet enabled applications. As can be seen, different applications have different patterns of TCP flow utilizations, however, all such flows may be switched or migrated among multiple network types as described above for efficiency, performance, and energy savings.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of managing Transmission Control Protocol (TCP) flows in a mobile device adapted to connect to two or more wireless network types, the method comprising:
    enabling, by the mobile device, simultaneous connection to a first wireless network of a first type via a first interface and a second wireless network of a second type via a second interface;
    executing, by the mobile device, a plurality of Internet-enabled applications via existing TCP connections over the first wireless network;
    determining, by the mobile device, that a migration of all TCP flows of the first wireless network is to be made from the first wireless network to the second wireless network;
    modifying, by the mobile device, a routing table of the mobile device such that any additional TCP connection will be created on the second wireless network, wherein the routing table is implemented only at the mobile device;
    waiting, based on a pattern of flow utilization corresponding to the plurality of Internet-enabled applications, based on applying a predetermined timeout period, or based on all TCP connections over the first wireless network being terminated, for a termination condition to occur;
    determining, by the mobile device, that the termination condition has occurred; and
    in response to the determining that the termination condition has occurred, disabling, by the mobile device, the first interface on the mobile device;
    wherein the mobile device is a smartphone.

2. The method of claim 1, wherein the predetermined timeout period for an existing TCP connection is set based on a type of the application with which the existing TCP connection is associated.

3. The method of claim 1, wherein the predetermined timeout period for an existing TCP connection is set based on a bandwidth of the existing TCP connection.

4. The method of claim 1, wherein the predetermined timeout period is set based on a power remaining status of the mobile device.

5. The method of claim 1, wherein the termination condition comprises a loss of signal condition.

6. The method of claim 1, wherein the two or more wireless network types include at least a WiFi type and a cellular type.

7. A mobile device comprising:
    a processor for executing computer-executable instructions;
    a memory module comprising a non-transient computer-readable medium for storing computer-executable instructions and data corresponding to a routing table; and
    a network interface module adapted to connect the mobile device to multiple networks having different network types;
    wherein the computer-executable instructions stored on the non-transient computer-readable medium of the memory module include instructions for:
        enabling simultaneous connection to a first network of a first type via a first interface and a second network of a second type via a second interface;
        executing a plurality of Internet-enabled applications via existing Transmission Control Protocol (TCP) connections over the first network;
        determining that a migration of all TCP flows of the first network is to be made from the first network to the second network;
        modifying a routing table of the mobile device such that any additional TCP connection will be created on the second network, wherein the routing table is implemented only at the mobile device;
        waiting, based on a pattern of flow utilization corresponding to the plurality of Internet-enabled applications, based on applying a predetermined timeout period, or based on all TCP connections over the first wireless network being terminated, for a termination condition to occur;
        determining that the termination condition has occurred; and
        disabling the first interface on the mobile device-in response to the determining that the termination condition has occurred;
    wherein the mobile device is a smartphone.

8. The mobile device according to claim 7, wherein the predetermined timeout period for an existing TCP connection is set based on a type of the application with which the existing TCP connection is associated.

9. The mobile device according to claim 7, wherein the predetermined timeout period for an existing TCP connection is set based on a bandwidth of the existing TCP connection.

10. The mobile device according to claim 7, wherein the predetermined timeout period is set based on a power remaining status of the mobile device.

11. The mobile device according to claim 7, wherein the termination condition comprises a loss of signal condition.

12. The mobile device according to claim 7, wherein the different network types include at least a WiFi type and a cellular type.

13. A non-transient computer-readable medium for use by a mobile electronic processing device, the non-transient computer-readable medium having stored thereon computer-executable instructions including instructions for:
    enabling simultaneous connection from the mobile electronic processing device to a first wireless network of a first type via a first interface and a second wireless network of a second type via a second interface;

executing a plurality of Internet-enabled applications via existing Transmission Control Protocol (TCP) connections over the first wireless network;

determining that a migration of all TCP flows of the first wireless network is to be made from the first wireless network to the second wireless network;

modifying the routing table of the mobile electronic processing device such that any additional TCP connection will be created on the second wireless network, wherein the routing table is implemented only at the mobile electronic processing device;

waiting, based on a pattern of flow utilization corresponding to the plurality of Internet-enabled applications, based on applying a predetermined timeout period, or based on all TCP connections over the first wireless network being terminated, for a termination condition to occur;

determining at the mobile electronic processing device that the termination condition has occurred; and disabling the first interface on the mobile electronic processing device in response to the determining that the termination condition has occurred;

wherein the mobile electronic processing device is a smartphone.

14. The non-transient computer-readable medium according to claim 13, wherein the different types include at least a WiFi type and a cellular type.

\* \* \* \* \*